INVENTORS
MAURICE ARTZT &
MILTON M. SOWIAK
BY Harold Christoffersen
Attorney

INVENTORS
MAURICE ARTZT &
MILTON M. SOWIAK
BY Harold Christoffersen
Attorney

INVENTORS
MAURICE ARTZT &
MILTON M. SOWIAK
BY Harold Christoffersen
Attorney

INVENTORS
MAURICE ARTZT &
MILTON M. SOWIAK
BY Harold Christoffersen
Attorney

CHARACTER GENERATOR

Filed July 26, 1966

INVENTORS
MAURICE ARTZT &
MILTON M. SOWIAK
BY Harold Christofferson
Attorney

United States Patent Office 3,444,319

Patented May 13, 1969

3,444,319

CHARACTER GENERATOR

Maurice Artzt, Princeton, and Milton M. Sowiak, Mercerville, N.J., assignors to Radio Corporation of America, a corporation of Delaware Filed July 26, 1966, Ser. No. 568,003
Int. Cl. H04l 15/24, 15/34
U.S. Cl. 178—30 6 Claims

ABSTRACT OF THE DISCLOSURE

A character generator for a matrix printer that prints character patterns by selecting various combinations of a plurality of character elements from a character forming matrix. Selected character elements of the matrix are grouped together to form a plurality of stroke patterns with certain elements being common to various stroke patterns and the stroke patterns are grouped together to form the character patterns, with certain stroke patterns, with certain stroke patterns being common to various character patterns.

A matrix printer may be defined as one in which each different printable character is made up of a distinctive group of small "picture elements" printed at selected locations in an imaginary print matrix or grid. One known type of matrix printer comprises a plurality of printer bars stacked side-by-side and which extend across the width of a document on one side thereof. A scanning anvil is located on the opposite side of the document and moves at constant speed from one end of the print line to the other. A character is printed by driving selected ones of the printer bars against the anvil in a series of steps as the anvil moves a distance corresponding to the width of a printed character.

In another type of matrix printer, a print head is moved from one end of the print line to the other. The print head includes a plurality of individually movable printing elements or styli which are selectively actuated as the print head is moved relative to the document.

One of the main advantages of a matrix type printer is that it eliminates the need for a large buffer storage for the line of information to be printed. However, some means must be provided for generating the signals for the characters to be printed. In general, an output matrix of switching or storage devices is employed, each device corresponding to a different picture element in the print matrix. The character to be printed is decoded, and the decoder outputs are coupled appropriately to the switching devices.

The number of coupling elements and connections between the decoder and the output matrix may be extensive. A switching device must be activated each time the character being printed requires the corresponding picture element. Assuming by way of example that the print matrix has seven columns and seven rows of picture elements, that there are sixty-four printable characters, and that the average printable character requires thirty percent of the picture elements, it can be seen that approximately 950 connections are required between the output of the decoder and the input of the output matrix if individual, direct connections are employed.

Moreover, some of the switching devices in the matrix are common to well over one-half of the printable characters. If the switching devices are cores, for example, this means that more than twenty-five windings must link some of the cores. The result is that rather large cores are required, with correspondingly high power requirements, and the cost of threading this large number of windings through the cores is high. On the other hand, if the switching devices are gates employing transistors having either resistor or diode coupling elements at the inputs thereof, some gates will require over twenty-five input resistors or diodes. This large number of input elements, assuming it is practical, imposes stringent tolerance requirements and is costly in view of the number of elements and connections thereto.

Accordingly, it is an object of this invention to provide an improved electronic character generator.

It is another object of this invention to provide an improved matrix character generator which has a reduced number of components and connections.

It is still another object of this invention to provide an improved character generator employing a character decoder and an output matrix, in which the number of connections from the decoder to the matrix is reduced.

Briefly stated, our invention recognizes and takes advantage of the fact that, in any given matrix font, there is a large number of "strokes," or multiple-picture-element features, each of which is common to a plurality of printable characters. In apparatus embodying the invention, "stroke networks" are coupled between the outputs of the decoder and the inputs of the matrix switching devices. A stroke network is activated whenever any of a plurality of characters with which the stroke or strokes is common is to be printed. The output of the stroke network, in turn, is coupled to the plurality of switching devices which control the printing of that stroke or strokes.

In the accompanying drawing, like reference characters denote like components, and:

Figure 1:
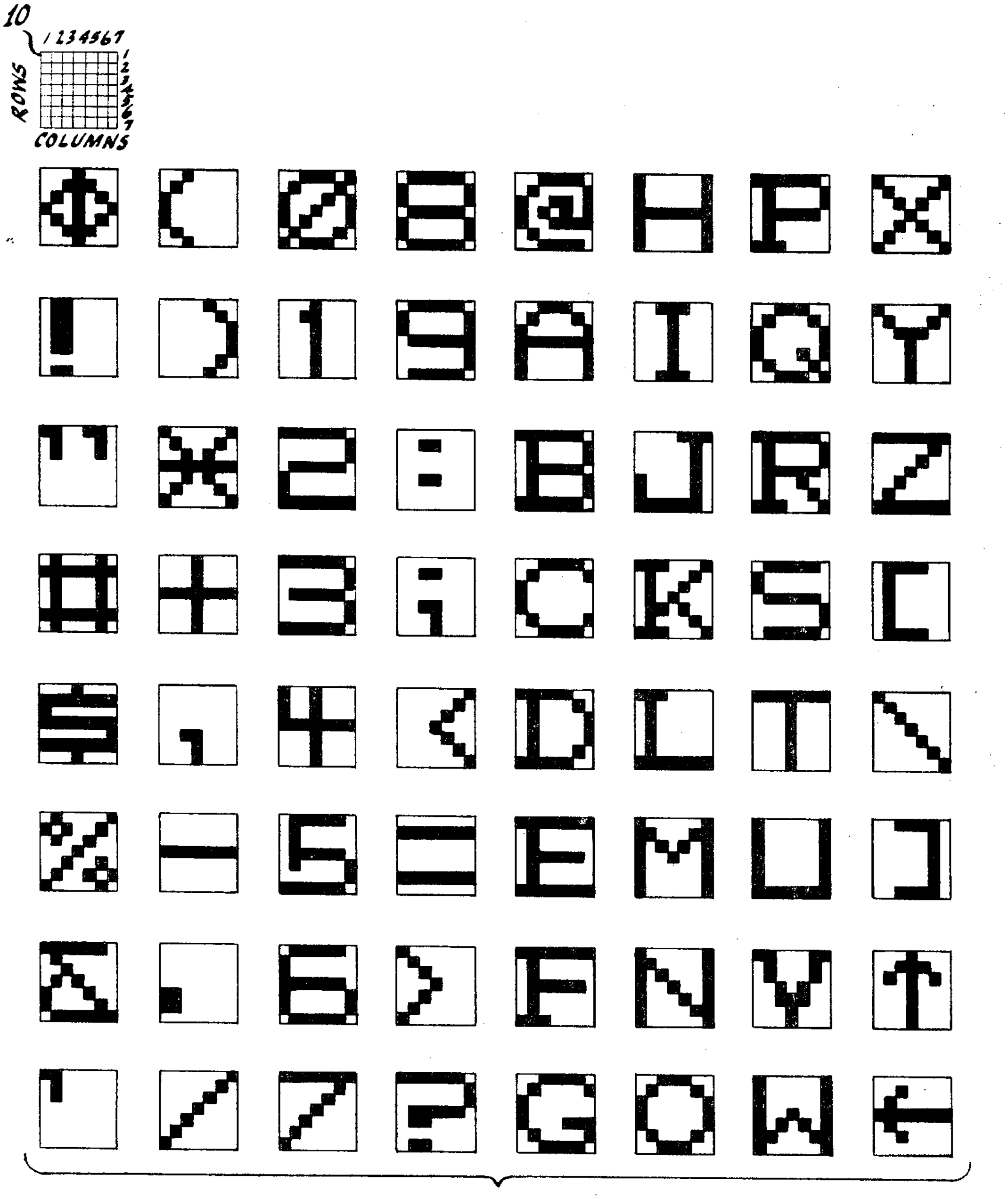
FIGURE 1 is a set of printable characters for a matrix printer.

In FIGURE 1, there is illustrated a set of sixty-four different characters, e.g., letters, numbers, symbols, etc., which may be printed by a matrix printer of the type in which the print matrix has seven rows and seven columns. The matrix itself may be identified in FIGURE 2 by the reference numeral 10. As shown there, there is a total of forty-nine picture element locations, each different location being defined by a different row-column combination.

As mentioned previously, the matrix printer (not shown) may be one which includes seven printer bars, one for each row, with a scanning anvil which moves beneath the printer bars from one end thereof to the other. By way of example, the letter H is printed by energizing all seven of the printer bars when the anvil is located at column 1. The result is the vertical stroke representing the leading vertical edge of the character H. The printer bar corresponding to row 4 of the matrix remains energized as the anvil scans across the area corresponding to columns 2 through 6 of the matrix. This results in the printing of the horizontal feature of the character H. All of the print bars are again energized when the anvil is positioned opposite column 7 of the print matrix.

Figure 2:
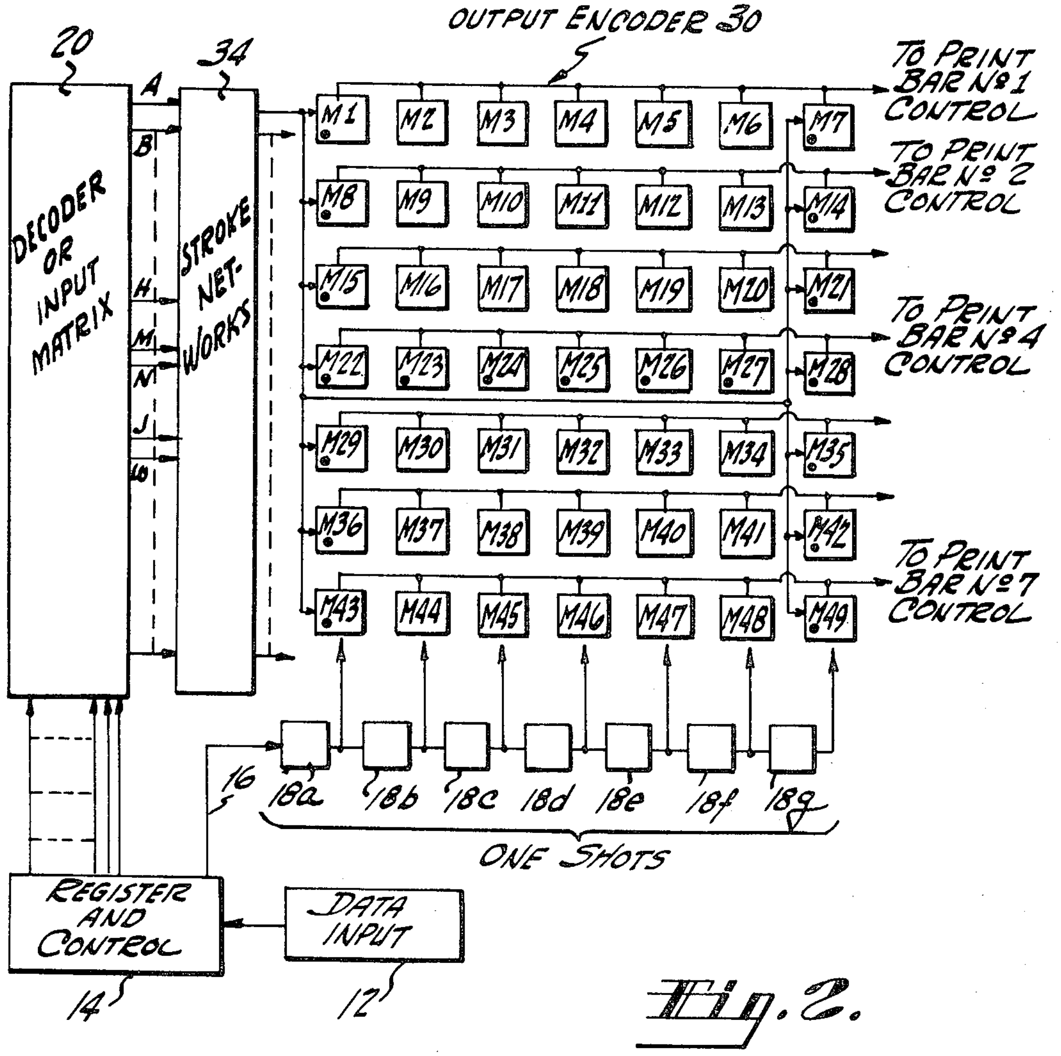
FIGURE 2 is a block diagram of a character generator embodying the invention.

It may be seen that in order to print any of the characters illustrated in FIGURE 1, signals must be supplied to the energizing means for the seven print bars selectively and in a series of seven successive time intervals, corresponding to the seven columns of the print matrix. FIGURE 2 is a block diagram illustrating a character generator embodying the present invention which is suitable for generating the aforementioned energizing signals.

The characters to be printed along a print line of a document are supplied serially by character from a data input device 12 to a unit 14, designated "register and control." This unit may include a binary data register for storing the input character of information, and means for generating a timing pulse upon the receipt of each different character. The timing pulse is sent over line 16 to a string of one-shots 18*a*, 18*b* . . . 18*g* for purposes to be described in detail hereinafter. The data outputs of the register and control unit 14 are supplied as inputs to a decoder 20 or input selection matrix, which may be any of several known types. The decoder 20 has a plurality of outputs, and each output corresponds to a different input character from the data device 12. Only one output of the decoder 20 is energized at any one time, and the output which is energized is that one which corresponds to the character stored in the register and control unit 14.

The individual outputs of the decoder 20 are supplied, in a manner to be described, to activate appropriate elements in an output encoder 30. Encoder 30 includes one switching element or storage device for each picture element in the print matrix 10 (FIGURE 1), and the various elements M1 . . . M49 may be functionally arranged in the form of a matrix corresponding to the print matrix. When the printer is one of the type mentioned previously, the outputs of all of the elements in any one row may be coupled together and supplied to the control circuitry, e.g., solenoid or amplifier, for the print bar or stylus for that row. For example, all of the elements M1 . . . M7 in the first row of the encoder 30 have their outputs connected together and to the control for print bar number 1.

The outputs of the several one-shots 18*a* . . . 18*g* in the timing chain are supplied to the switching elements in respective columns of the encoder 30. In particular, the output of first one-shot 18*a* is effectively applied to all of the switching elements in the first column of the encoder 30; the output of one-shot 18*b* is applied to all of the switching elements in column 2 of encoder 30, etc. Only one of the one-shots provides an output of the proper amplitude and polarity for controlling the switching elements at any one time. The first one-shot 18*a* provides an output during a first timing period; second one-shot 18*b* provides an output of appropriate polarity and amplitude during a second, following timing period, etc. Whenever a switching element receives signals simultaneously from one of the one-shots and from one of the decoder outputs, that switching element becomes fully activated and sends a signal to its associated printer bar control to effect printing by that associated print bar.

By way of example, consider the technique for printing the letter H. When the data input device 12 supplies coded information designating H to the register and control unit 14, the decoder 20 output line corresponding to H is energized. In response thereto, all of the switching elements in the first and last columns of the output encoder 30 and the elements in the middle row of the encoder must receive input signals in response to the decoder output. Those switching elements are designated by circles within the boxes of the encoder 30.

When one-shot 18*a* then provides an output, all of the switching elements in column 1 become fully enabled, and signals are sent to the controls for all of the print bars. When second one-shot 18*b* produces its output, switching element M23 becomes fully enabled to activate the control for print bar number 4, etc. Finally, when the last one-shot 18*g* produces its output, all of the switching elements in the last column of the encoder become fully enabled to again activate the controls for all of the print bars.

It is thus seen that, in order to effect the printing of any of the characters illustrated in FIGURE 1, those switching elements in the output encoder 30 which correspond to the picture elements in FIGURE 1 for that character must receive input signals in response to the energized output of the decoder. To print the character H in the manner discussed above, nineteen of the forty-nine switching elements must be activated. If the output of the decoder 20 were to be applied directly to the elements in the encoder 30, as in the case of prior art arrangements, nineteen coupling elements would be required, one at the input of each of the different ones of the nineteen switching elements to be energized. The same is true for all of the other printable characters.

In fact, if all of the outputs of the decoder 20 were independently coupled to the appropriate switching elements in the encoder 30, a total of 978 coupling devices would be required to print the characters illustrated in FIGURE 1. These coupling elements may be resistors or diodes, for example, in the case of resistor-transistor or diode-transistor logical switching elements. On the other hand, if the encoder 30 is a matrix of cores, of the general type illustrated in the copending application Ser. No. 241,756 of Ross M. Carrell et al., filed Dec. 3, 1962 and assigned to the same assignee as the instant invention, a total of 978 wires would have to link the cores in the encoder 30. In either event, the expense of winding the cores as aforementioned, or the expense of the numerous coupling devices becomes immediately apparent.

These disadvantages of the prior art arrangements are overcome according to the present invention by employing so-called "stroke networks 34" between the outputs of the decoder 20 and the inputs to the encoder 30. An analysis and study of the characters in FIGURE 1 will show that there is a large number of strokes or multiple-picture-element features, each of which is common to several different printable characters. For example, it may be seen that the letters U, W, M, N and H have in common all the vertical elements in the first and last columns of the matrix. If the outputs from the decoder 20 corresponding to those letters were coupled independently to the switching elements in the first and last columns of the encoder 30, a total of $(5 \times 14) = 70$ coupling devices would be required. However, if the five outputs of the decoder 20 corresponding to these five letters activated a single logic element, e.g., an OR gate, and the output of that element was coupled to the switching elements in the first and last columns of the encoder 30, the number of coupling devices would be reduced from seventy to nineteen, a net saving of fifty-one coupling devices and the connections thereto. This represents not only a large saving in the number of elements and the cost thereof, but also a great simplification in the interconnections, which is of special importance if the system is to be fabricated, for example, in integrated form.

Figure 3:
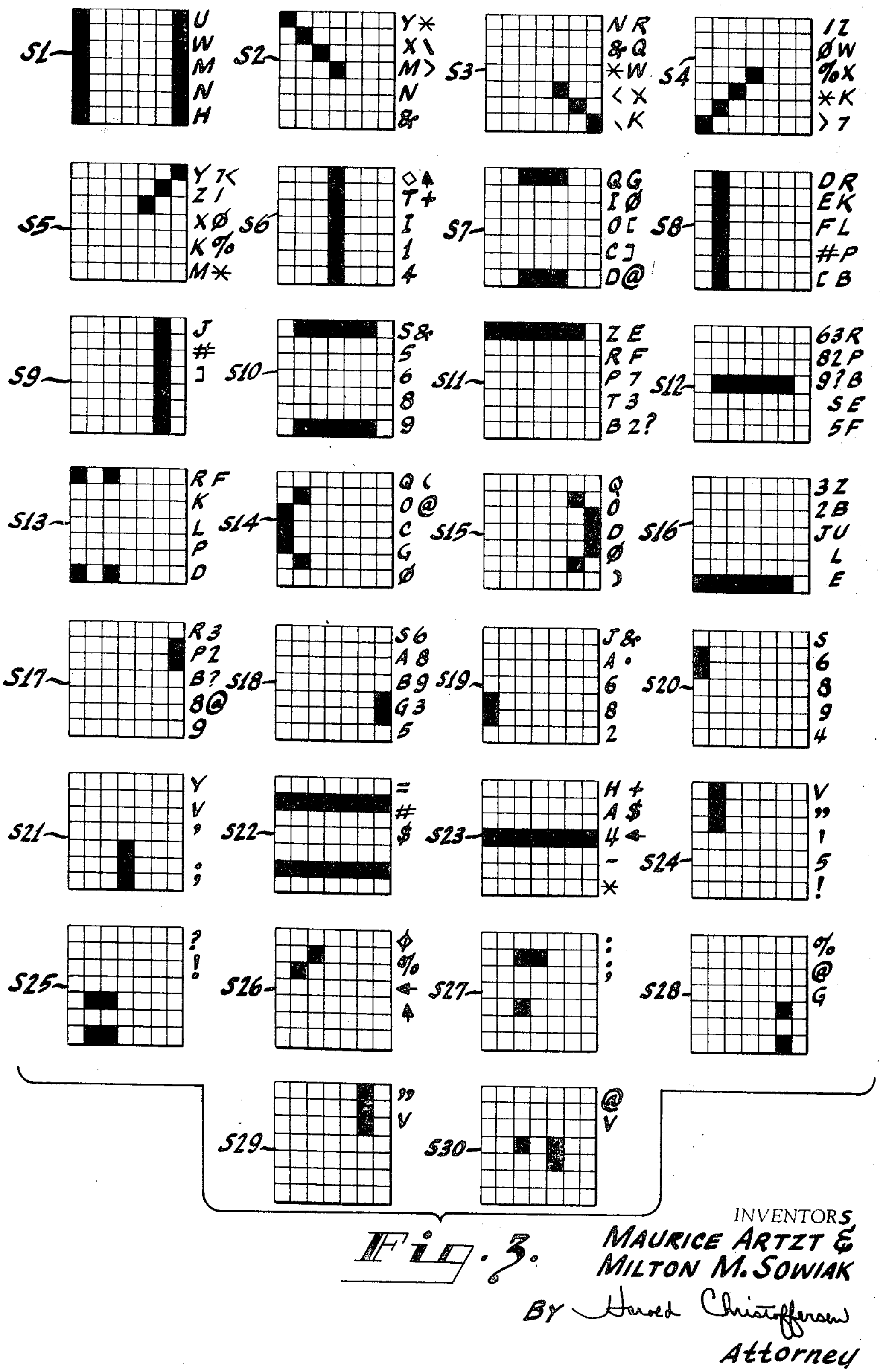
FIGURE 3 is a set of "strokes" or multiple-picture-element features, each of which is common to a plurality of the printable characters in FIGURE 1.
Figure 4:
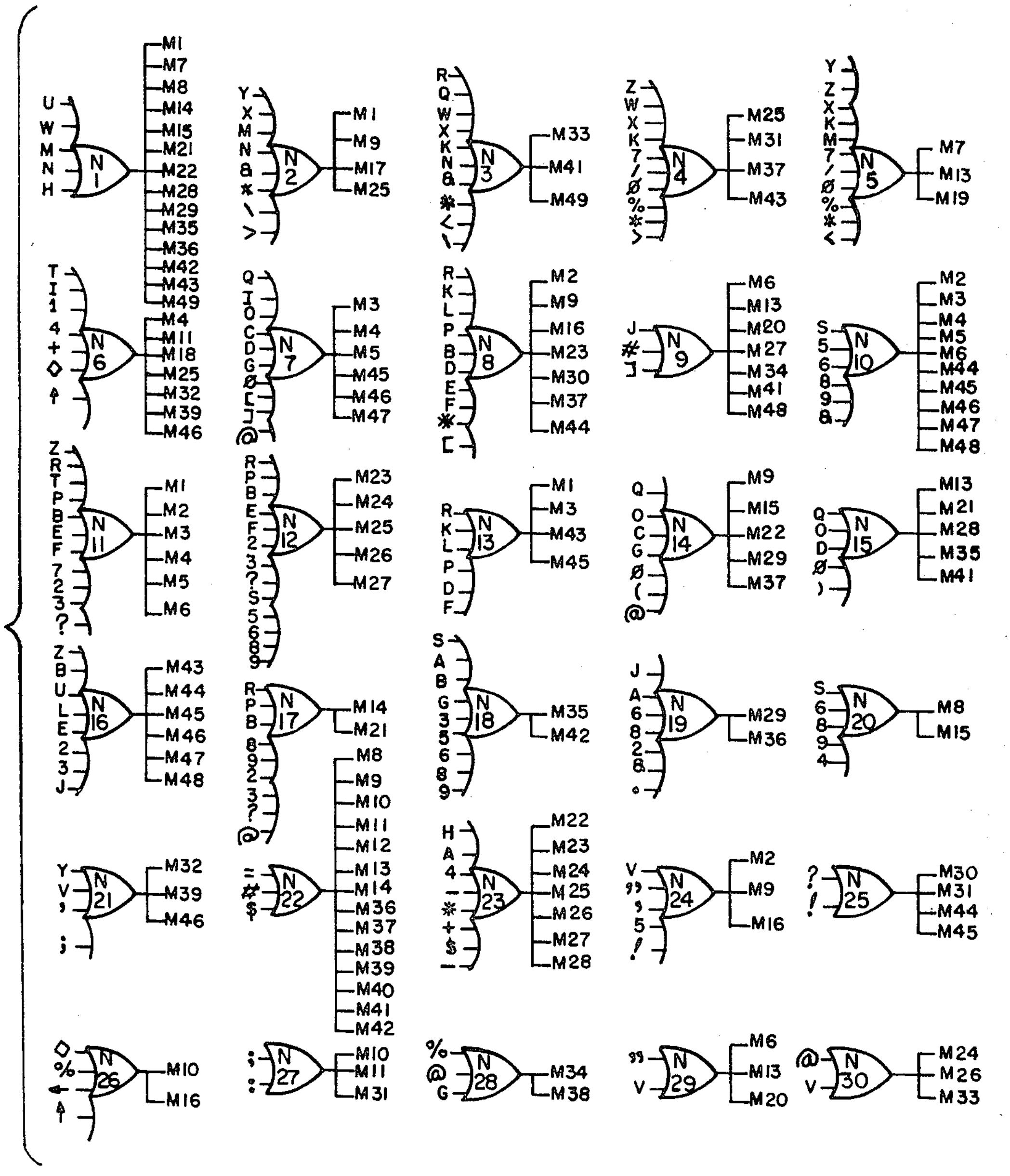
FIGURE 4 is a set of stroke network gates with the inputs thereto and outputs therefrom indicated.

FIGURE 3 illustrates a set of thirty strokes or features which appear many times in the characters of FIGURE 1. These strokes or features S1 . . . S30 are selected for simplifying the coupling arrangement between the decoder 20 and the elements in the output encoder 30 in FIGURE 2. The box 34 labeled "stroke networks" in FIGURE 2 includes thirty stroke network gates N1 . . . N30 corresponding, respectively, to the strokes or features S1 . . . S30 in FIGURE 3. These gates are illustrated in FIGURE 4. Also indicated in FIGURE 4 are the decoder 20 outputs which are supplied to these stroke network gates and the switching elements in the encoder 30 which are driven by the outputs of these network gates.

By way of example, consider network gate N1. This gate generates the signals for printing the strokes denoted by S1 in FIGURE 3. These strokes are common to the letters U, W, M, N and H. Thus the outputs from the decoder 20 (FIGURE 2) corresponding to the letters U, W, M, N and H are coupled to the input of the network gate N1, as illustrated in FIGURE 4. To print the strokes S1, signals must be supplied to all of the switching elements in the first and last columns of the encoder matrix 30 (FIGURE 2). Thus, the output from network gate N1 is coupled to all of these switching elements, as indicated in FIGURE 4. A similar analysis holds true for all of the other strokes or features, as may be verified by the inputs and outputs of the corresponding network gates in FIGURE 4.

In some cases, a few of the picture elements required by certain ones of the printable characters are not "covered" by the strokes or features illustrated in FIGURE 3. In those instances, a few of the decoder 20 outputs are sent or coupled directly to a few of the switching elements in the output encoder 30 in addition to being applied to one or more of the stroke network gates. A listing of the various inputs to the switching elements M1 . . . M49 of the output encoder 30 is as follows:

| M1 | M2 | M3 | M4 | M5 | M6 | M7 |
|---|---|---|---|---|---|---|
| 4<br>″<br>′<br>V<br>N1<br>N2<br>N11<br>N13 | %<br>N8<br>N10<br>N11<br>N24 | A<br>!<br>(<br>N7<br>N10<br>N11<br>N13 | A<br>$<br>N6<br>N7<br>N10<br>N11 | J<br>A<br>)<br>″<br>N7<br>N10<br>N11 | C<br>G<br>@<br>N9<br>N10<br>N11<br>N29 | T<br>J<br>E<br>F<br>V<br>N1<br>N5 |
| M8 | M9 | M10 | M11 | M12 | M13 | M14 |
| %<br>N1<br>N20<br>N22 | A<br>N2<br>N8<br>N14<br>N22<br>N24 | !<br>1<br>N22<br>N26<br>N27 | N6<br>N22<br>N27 | ◇<br>↑<br>N22 | A<br>N5<br>N9<br>N15<br>N22<br>N29 | C<br>G<br>N1<br>N7<br>N22 |
| M15 | M16 | M17 | M18 | M19 | M20 | M21 |
| A<br>$<br>N1<br>N14<br>N20 | N8<br>N24<br>N26 | !<br>N2 | @<br>N6 | @<br>N5 | ◇<br>↑<br>N9<br>N29 | A<br>N1<br>N15<br>N17 |
| M22 | M23 | M24 | M25 | M26 | M27 | M28 |
| 6<br>◇<br>N1<br>N14<br>N23 | &<br>N8<br>N12<br>N23<br>! | !<br>N12<br>N23<br>N30 | <<br>N2<br>N4<br>N6<br>N12<br>N23 | N12<br>N23<br>N30 | N9<br>N12<br>N23 | 9<br>@<br>◇<br>N1<br>N15<br>N23 |
| M29 | M30 | M31 | M32 | M33 | M34 | M35 |
| N1<br>N14<br>N19 | ◇<br>←<br>.<br>5<br>N8<br>N25 | V<br>,<br>N4<br>N25<br>N27 | :<br>@<br>N6<br>N21 | G<br>N3<br>N30 | ◇<br>N9<br>N28 | @<br>$<br>N1<br>N15<br>N18 |
| M36 | M37 | M38 | M39 | M40 | M41 | M42 |
| N1<br>N19<br>N22 | .<br>N4<br>N8<br>N14<br>N22 | ◇<br>←<br>N22 | N6<br>N21<br>N22 | %<br>◇<br>N22 | N3<br>N9<br>N15<br>N22 | C<br>%<br>N1<br>N18<br>N22 |
| M43 | M44 | M45 | M46 | M47 | M48 | M49 |
| A<br>5<br>N1<br>N4<br>N13<br>N16 | N8<br>N10<br>N16<br>N25 | (<br>N7<br>N10<br>N13<br>N16<br>N25 | $<br>N6<br>N7<br>N10<br>N16<br>N21 | )<br>N7<br>N10<br>N16 | C<br>N9<br>N10<br>N16<br>N28 | Z<br>L<br>E<br>2<br>A<br>N1<br>N3 |

From a study of the above list, it may be verified that there is a total of 226 separate inputs to the forty-nine switching elements M1 . . . M49. In addition, a study of FIGURE 4 indicates that there are a total of 195 inputs to the various stroke network gates N1 . . . N30. Considering that each input represents a coupling device, e.g., diode or resistor, it may be seen that the system embodying the invention requires a total of 421 coupling elements, as opposed to the 978 coupling elements required in the prior art type system wherein all of the decoder outputs are coupled directly to the individual switching elements in the encoder 30.

Figure 5:
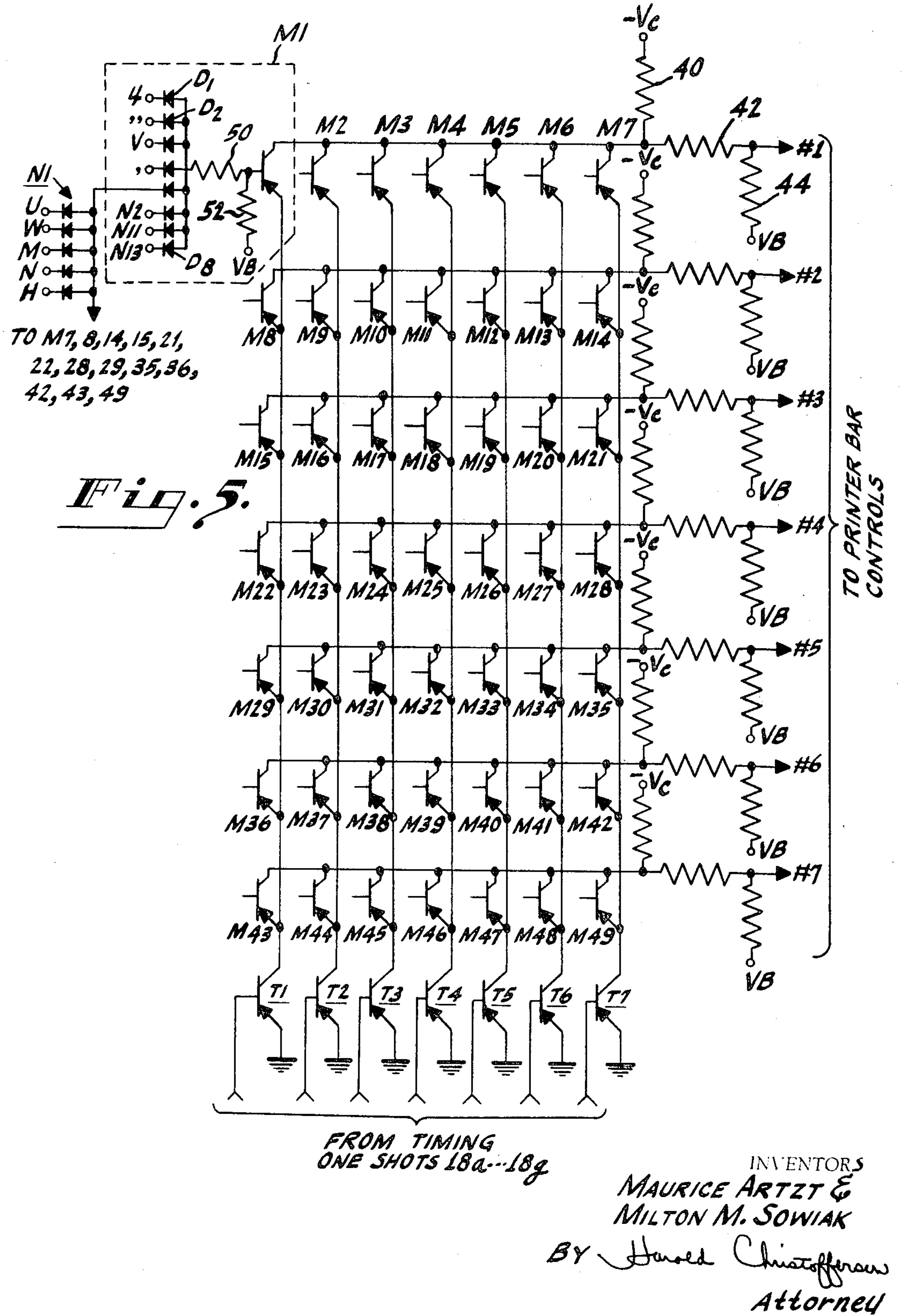
FIGURE 5 is a schematic diagram showing the general features of the output encoding matrix.

FIGURE 5 is a schematic diagram of one suitable circuit arrangement that may be used for the encoder 30. This circuit arrangement includes forty-nine transistors arranged in seven rows and seven columns corresponding to the switching elements M1 . . . M49 in FIGURE 2. Each of these transistors is given the same designation, e.g., M1, M2 . . . M49, as its corresponding switching element in the decoder although, as will be described hereinafter, a separate diode gate is associated with each of the transistors. The diode gate and transistor combination actually correspond to the switching element M1 etc. in the encoder.

Each of the transistors in any one column has its emitter connected in common with the emitters of all of the other transistors in that column. For example, the emitters of all of the transistors in the first column (FIGURE 5) are connected together and to the collector of a transistor T1, the emitter of which is connected to circuit ground. The base of transistor T1 is coupled to the output of the first timing one-shot 18*a* (FIGURE 2). The emitters of all of the transistors in the second column are connected together and to the collector of the second timing transistor T2, the base of which is coupled to the output of the second timing one-shot 18*b* (FIGURE 2), etc.

The collector electrodes of all of the transistors in the same row are connected together and are coupled to the control circuitry for the associated print bar or stylus. By way of example, the collector electrodes of all of the transistors in the upper row (row 1) are connected together and by way of a resistor 40 to a source of bias potential, designated $-V_c$. This source may be, for example, a battery of $V_c$ volts having its negative terminal connected at the upper end of resistor 40 and having its positive terminal grounded. A resistor 42 is connected from the common collector junction to the output terminal, and by way of a resistor 44 to a source of $V_b$ volts. The connections to the collector electrodes of the transistors in the other rows is similar and will not be described further.

For simplification and clarity of drawing, the complete circuit for only the first switching element M1 is shown in FIGURE 5. The input to the transistor for element M1 includes a diode gate having a plurality of diodes D1 . . . D8 with their anodes connected in common and by way of a resistor 50 to the base of the transistor. A resistor 52 is connected between this base and a source of $V_b$ volts. The value of $V_b$ is selected so that the transistor remains nonconducting in the absence of an input to one or more of the diodes. The inputs to these diodes are designated adjacent the input terminals thereto. These inputs are identical to those listed in the above compilation for the switching element M1.

In addition, the circuitry for the stroke network gate N1 is shown for completeness. This stroke network includes five diodes having their anodes connected in common and having their cathodes connected to the outputs U, W, M, N and H of the decoder 20 (FIGURE 2). The output of the stroke network N1, in addition to being supplied to one input of the switching element M1 also is supplied to the inputs of the switching elements M7, 8, 14, 15, 21, 22, 28, 29, 35, 36, 42, 43, and 49.

Thus, whenever any of the outputs U, W, M, N or H of the decorder 20 (FIGURE 2) is energized, the output of stroke network gate N1 goes low and energizes one input to each of the switching devices in the first and last columns of the encoder. When first one-shot 18*a* produces a negative going output, transistor T1 turns on and completes a path to circuit ground for each of the emitter electrodes of the various transistors in column 1. Since each of these transistors receives an enabling input from stroke network gate N1 at this time, all of the transistors in the first column turn on and provide enabling signals to their respective print bar controls. In like manner, when the output of the last one-shot 18*g* (FIGURE 2) produces a low output, transistor T7 turns on and provides a low impedance path to circuit ground for each of the emitter electrodes of the transistors in the last column. Since each of these transistors receives an energizing input at this time from stroke network gate N1, all of the transistors in the last column turn on and produce enabling signals to the control circuitries for their respective print bars, whereby vertical strokes are produced in all of the picture element locations in columns 1 and 7 of the print matrix.

What has been illustrated and described is an improved character generator for producting matrix character signals with a reduced number of electrical components and connections. Also, in a printer system of the type wherein a separate stylus is provided for each picture element of the print matrix, the outputs of the forty-nine transistors (FIGURE 5) would be coupled individually to the control circuitry for the respective ones of the printer styli, rather than having all of the collectors in a row of transistors connected together. Further, the switching elements in the encoder could be cores rather than transistors, in which case the outputs of the stroke network gates would be used to switch the cross to the set state. The cores thereafter would be switched to the reset state column-by-column by the outputs of the timing one-shots 18*a* . . . 18*g*.

What is claimed is:

1. The combination comprising:

an input device having character entry means and a plurality of output lines on each different one of which an output signal is produced in response to a different input character;

an encoder having a plurality of switching means;

output signal responsive means responsive to each different output signal from the input device for changing the operating states of a different combination of said switching means;

said output signal responsive means including a plurality of gate means each different one of which has its output coupled to a different group of said switching means, each different group of switching means being common to a different set of characters, and each gate means having its inputs coupled to receive those output signals from the input device which represent the characters of the associated set, said switching means being functionally arranged in a matrix of rows and columns, said output signal responsive means being responsive to an output signal for changing the operating states of those switching means whose configuration in the matrix conforms to the shape of the character represented by that output signal, and means independent of said gate means coupling some of said output signals individually to selected ones of said switching means.

2. In a matrix printer that forms character patterns from selected combinations of a plurality of character elements arranged in rows and columns in a character matrix, the combination comprising, a plurality of switching elements, arranged in a matrix of rows and columns, with each switching element corresponding to a separate character element of said character matrix, for producing when activated character element signals that cause the printing of character elements corresponding to said signals, first means coupled to group together selected ones of said switching elements to form a plurality of subsets of character element signals, with each subset effectively defining a portion of a character pattern and with certain ones of said switching elements being common to a plurality of said subsets, and second means coupled to group together selected subsets of said switching elements to form a plurality of sets of character element signals, with each set effectively defining a separate character pattern and with certain subsets of said switching elements being common to a plurality of said sets.

3. The combination in accordance with claim 2 wherein said first means comprises a plurality of stroke network gates that group together pluralities of switching elements so as to define a plurality of strokes that occur in character patterns.

4. The combination in accordance with claim 3 wherein said second means comprises a decoder that groups together various stroke network gates so as to define various character patterns.

5. The combination in accordance with claim 4 wherein the outputs of all of said switching elements in any row of said switching elements matrix are coupled to a common output point for that row.

6. The combination in accordance with claim 4 that further includes control signal means for generating control signals and means for applying said control signals to said switching elements matrix column by column.

References Cited

UNITED STATES PATENTS

| | | | |
|---|---|---|---|
| 2,575,017 | 11/1951 | Hunt | 178—30 |
| 2,987,715 | 6/1961 | Jones et al. | 178—15 |
| 3,099,711 | 7/1963 | Foley et al. | 178—30 |
| 3,130,397 | 4/1964 | Simmons | 178—30 |
| 3,140,403 | 7/1964 | Mörwald. | |
| 3,204,234 | 8/1965 | Nakauchi | 340—166 X |
| 3,212,064 | 10/1965 | Krieger | 340—166 X |

THOMAS A. ROBINSON, *Primary Examiner.*

M. M. CURTIS, *Assistant Examiner.*

U.S. Cl. X.R.

178—15; 340—324